United States Patent
Shen et al.

(10) Patent No.: US 6,512,865 B1
(45) Date of Patent: Jan. 28, 2003

(54) CROSS-TRAFFIC SUPPRESSION IN WAVELENGTH DIVISION MULTIPLEXED SYSTEMS

(75) Inventors: Tek-Ming Shen, Westfield, NJ (US); Wenhua Lin, Pasadena, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 36 days.

(21) Appl. No.: 09/652,506

(22) Filed: Aug. 31, 2000

(51) Int. Cl.$^7$ ................................................ G02B 6/28
(52) U.S. Cl. ................................................. 385/24
(58) Field of Search .............................. 385/15, 24, 46

(56) References Cited

U.S. PATENT DOCUMENTS 5,136,671 A * 8/1992 Dragone ...................... 385/17
6,229,938 B1 * 5/2001 Hibino et al. ............... 359/124

\* cited by examiner

*Primary Examiner*—Hung N. Ngo
(74) *Attorney, Agent, or Firm*—Georgia J. Murgia

(57) ABSTRACT

A scheme is described for controlling adjacent channel crosstalk so that an optical receiver can accurately detect the presence of a signal in its respective optical channel after a loss of signal condition occurs. According to illustrative embodiments of the invention, crosstalk-induced cross-traffic is prevented so that traffic from an adjacent channel is not carried in a channel that is out of service due to a loss of signal condition. More specifically, adjacent channel crosstalk, which might otherwise exceed the receiver sensitivity threshold of the failed channel, is substantially reduced or eliminated so that a receiver will not improperly identify and lock onto an adjacent channel thereby causing the cross-traffic condition.

12 Claims, 2 Drawing Sheets

CROSS-TRAFFIC SUPPRESSION IN WAVELENGTH DIVISION MULTIPLEXED SYSTEMS

TECHNICAL FIELD

The invention relates generally to lightwave communication networks and, more particularly, to controlling crosstalk-related impairments in wavelength division multiplexed signals in such networks.

BACKGROUND OF THE INVENTION

Recent advances in communication technologies are enabling service providers to meet the increasing demands being placed on today's networks. For example, optical fiber is fast becoming a transmission medium of choice for many communication networks because of the speed and bandwidth advantages associated with optical transmission. In addition, wavelength division multiplexing (WDM) is being used to obtain even more bandwidth and speed in today's optical transmission systems. In its simplest form, WDM is a technique whereby parallel data streams modulating light at different wavelengths are coupled simultaneously into the same optical fiber. As such, WDM offers the capability to combine many "optical channels" each at a different wavelength for simultaneous transmission as a composite optical signal in a single optical fiber. By using optical transmission and WDM in the backbone networks, the communications industry has made great strides in terms of bandwidth and speed.

However, the features of WDM which give rise to the many advantages also present problems that must be addressed by system and network designers. For example, a common approach to increasing bandwidth is to increase the number of optical channels in the WDM signal and to decrease the spacing between channels. As a result, one problem that has to be addressed is adjacent channel crosstalk. In particular, crosstalk can be a significant problem in a WDM system because an optical channel can be affected by adjacent channels due to the high power being transmitted in each of the closely-spaced channels. As such, many components and systems are designed according to particular specifications with regard to crosstalk suppression. As an example, some optical demultiplexers, which are used to separate a WDM signal into its constituent wavelength channels, have a crosstalk suppression requirement meaning that the device is designed to suppress power in adjacent channels by a prescribed amount, e.g., 22 db, relative to the channel of interest.

To date, bit error rate (BER) performance has been the principle factor when determining appropriate crosstalk suppression design requirements for components. In particular, the bit error rate performance of an optical channel can be adversely affected by the crosstalk contribution from adjacent channels. As such, components such as optical demultiplexers are designed to ensure that crosstalk is suppressed by a prescribed amount to ensure acceptable bit error rate performance. Although acceptable bit error rate performance is a critical parameter for optical transmission, we have discovered that existing crosstalk suppression requirements do not effectively address other crosstalk-induced impairments in WDM systems.

SUMMARY OF THE INVENTION

By substantially reducing or eliminating crosstalk contribution from adjacent channels in a WDM optical signal according to the principles of the invention, the presence or absence of an optical channel can be accurately detected by an optical receiver. As a result, channel mis-identification, which might otherwise result from the detection of adjacent channel crosstalk signal power exceeding the optical receiver's sensitivity threshold, is substantially avoided.

More specifically, we have discovered that crosstalk contribution from adjacent channels gives rise to a problem when a particular channel is out of service for any number of reasons, e.g., circuit pack failure or removal, automatic power shutdown mechanisms, inadvertent path or equipment disruptions, and so on. In particular, any of these above conditions typically cause a loss of signal (LOS) condition for the affected channel whereby power in that channel is either completely shut off or substantially reduced thus resulting in the receiver losing synchronization with the received signal. Many WDM systems have recovery mechanisms for restoring service whereby the loss of signal condition is cleared once the receiver locks back onto a received signal. Unfortunately, crosstalk from adjacent channels can cause a receiver in the failed channel to actually lock onto an adjacent channel because crosstalk power in the adjacent channel is above the receiver sensitivity threshold in the failed channel. Typically, a receiver will lock onto a signal as a function of the signal attaining a prescribed bit error rate (BER) level. Therefore, the receiver improperly identifies crosstalk power from the adjacent channel as an indication that the failed channel has been restored. As a result of this channel mis-identification, the loss of signal condition is improperly cleared (e.g., false LOS recovery) and the traffic from the adjacent channel is now present on the originally failed channel. We refer to this crosstalk-induced impairment as "cross-traffic".

BRIEF DESCRIPTION OF THE DRAWING

A more complete understanding of the invention may be obtained from consideration of the following detailed description of the invention in conjunction with the drawing, in which.

DETAILED DESCRIPTION OF THE INVENTION

Although the illustrative embodiments are described in the context of a loss of signal condition for an individual optical channel of a WDM optical signal, those skilled in the art will understand from the teachings herein that the principles of the invention are equally applicable to other sources of cross-traffic. For example, the principles of the invention can be advantageously employed to substantially reduce or eliminate cross-traffic caused by wavelength drift in components (e.g., lasers, optical demultiplexers, etc.), power divergence in optical channels due to unequal gain spectra in optical amplifiers, and so on. Accordingly, the embodiments shown and described herein are only meant to be illustrative and not limiting.

Figure 1A:
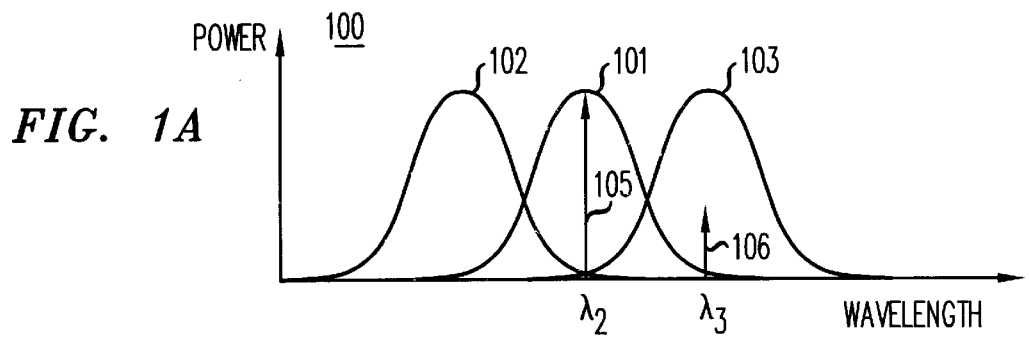
FIGS. 1A and 1B show exemplary plots of the filter profile of an optical demultiplexer helpful to understanding the principles of the invention.

FIG. 1A shows an exemplary plot 100 of optical signal power versus wavelength for an optical channel at the output of an optical demultiplexer (not shown). In particular, FIG. 1A represents a well-known filter profile for an optical demultiplexer whereby plot 101 represents an optical channel of interest and plots 102 and 103 correspond to adjacent optical channels. In the example shown in FIG. 1A, the optical channel of interest, denoted by arrow 105, has a wavelength $\lambda_2$ and is in-service. For simplicity of illustration, FIG. 1A shows one adjacent channel, denoted by arrow 106, having a wavelength $\lambda_3$. Because of the crosstalk suppression provided by the optical demultiplexer, the power level of channel 105 is substantially higher than channel 106.

By way of example, assume that optical channel 105 has an output power of −12 dBm (e.g., from an optical amplifier) and the optical demultiplexer has an adjacent crosstalk suppression of 22 dB. As such, the power level of optical channel 106, when viewed as crosstalk signal power with respect to optical channel 105, would be approximately −34 dBm. In a typical system, the sensitivity threshold of an optical receiver tuned to receive optical channel 105 could be −34 dBm to ensure a bit error rate (BER) of $10^{-10}$. Because optical channel 105 is in service, i.e., present, the crosstalk signal power in optical channel 106 therefore does not deleteriously affect the transmission of optical channel 105. More specifically, the crosstalk suppression in the optical demultiplexer is sufficient to ensure substantially error-free transmission.

Figure 1B:
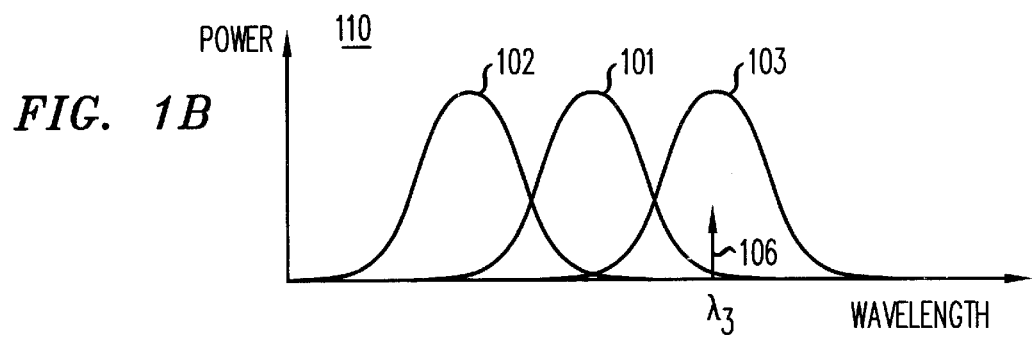

However, FIG. 1B illustrates a problem when optical channel 105 (FIG. 1A) is out of service, e.g., when there is a loss of signal (LOS) condition for that channel. Because optical channel 105 is no longer present, the crosstalk signal power of optical channel 106 therefore becomes a problem. Continuing with the above example, the optical receiver tuned to receive the optical channel 105, which is now absent, instead sees crosstalk signal power from adjacent optical channel 106 at −34 dBm. Because this signal power is at the receiver's sensitivity threshold, the optical receiver will mis-identify optical channel 106 as optical channel 105 and the clock in the optical receiver will incorrectly lock onto the adjacent channel and clear the loss of signal condition for optical channel 105. Hence, a cross-traffic condition occurs as optical channel 106 is now being improperly received by the optical receiver assigned to optical channel 105.

It should be noted that the above example is meant to be illustrative. In particular, the values for receiver sensitivity, launch power, crosstalk suppression, and so on are exemplary and not limiting in any way. The values were chosen to show how the problem of cross-traffic can, in fact, arise consistent with our discovery during experimentation with actual systems and components. Regardless of the actual values that may give rise to the problem of cross-traffic, the embodiments of the invention described hereinafter are intended to substantially reduce or eliminate the problem of cross-traffic, which is problematic both from an operational point of view as well as a social point of view (e.g., customer satisfaction, privacy issues, and so on).

Cross-traffic conditions can be substantially eliminated by employing system components that provide crosstalk suppression of a prescribed amount that is not only sufficient for achieving acceptable bit error rates, but also sufficient to ensure that adjacent channel crosstalk power levels do not exceed the optical receiver's sensitivity threshold. The appropriate amount of crosstalk suppression would depend on several factors including, but not limited to: receiver sensitivity, launch power for the optical channels, loss budget of the optical transmission path, and gain profile of the optical amplifiers. Factors such as wavelength drift of components such as lasers and demultiplexers (e.g., due to aging, temperature, etc.) and power divergence of adjacent channels (due to unequal gain of optical amplifiers) are also factors affecting cross-traffic which need to be taken into account in practical system design and implementation.

By way of example, we have discovered that approximately 35 dB crosstalk suppression would be sufficient in most cases to ensure that crosstalk signal power from adjacent channels does not cause an optical receiver to falsely lock onto an adjacent channel during a loss of signal condition. However, this level of crosstalk suppression has not yet been demonstrated in existing technologies such as waveguide grating routers, thin film filters, and diffraction grating filters, for example. Most optical demultiplexers based on these technologies are only able to achieve approximately 22 dB crosstalk suppression with high enough yields to be commercially practical.

Figure 2:
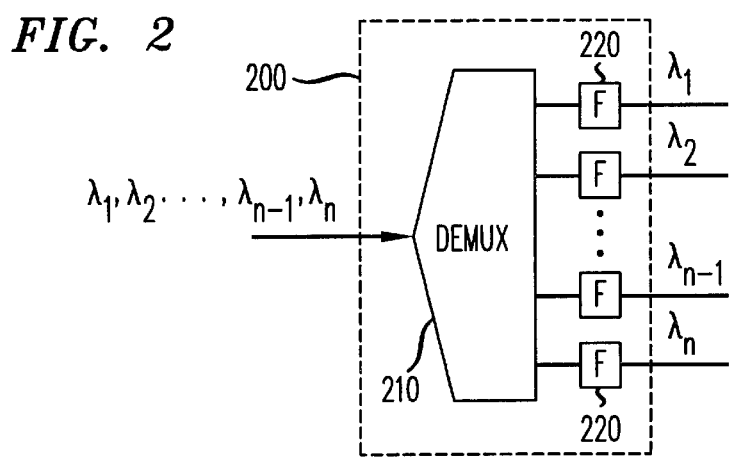
FIGS. 2 and 3 are simplified block diagrams of illustrative embodiments of the invention.

FIG. 2 shows an illustrative embodiment of an optical demultiplexer arrangement in which the principles of the invention can be employed. More specifically, optical demultiplexer arrangement 200 includes an optical demultiplexer 210 having a single input for receiving a multi-wavelength WDM signal that includes optical channels shown here as having wavelengths $\lambda_1, \lambda_2, \ldots, \lambda_{n-1}, \lambda_n$. Optical demultiplexer 210 further includes outputs, each of which is capable of supplying a single optical channel of a particular wavelength, e.g., first output for optical channel with wavelength $\lambda_1$, second output for optical channel with wavelength $\lambda_2$, and so on. Various types of optical demultiplexers and the operation thereof are well-known by those skilled in the art. By way of example, optical demultiplexer 210 could be a waveguide grating router in one illustrative embodiment. As shown in FIG. 2, optical demultiplexer arrangement 200 includes a plurality of optical filters 220, each being coupled to an output of optical demultiplexer 210. Optical filters 220 can be any type of single channel bandpass filter capable of filtering out and passing only a single wavelength. Some well known filters include thin film filters, fiber Bragg gratings, and so on.

By including an optical filter 220 after each output of optical demultiplexer 210 but before the optical receivers (not shown), any wavelength not within the passband of the respective optical filters 220 will therefore be filtered out before reaching the respective optical receiver. Consequently, the potential for channel mis-identification (due to adjacent channel crosstalk) by an optical receiver that experiences a loss of signal in its respective optical channel is substantially eliminated. The combination of optical filters 220 with optical demultiplexer 210 therefore effectively improves the crosstalk suppression performance as compared to only relying on crosstalk suppression provided by optical demultiplexer 210. By way of example, we have found that crosstalk suppression on the order of approximately 35 dB can be realized in the embodiment shown in FIG. 2.

Figure 3:
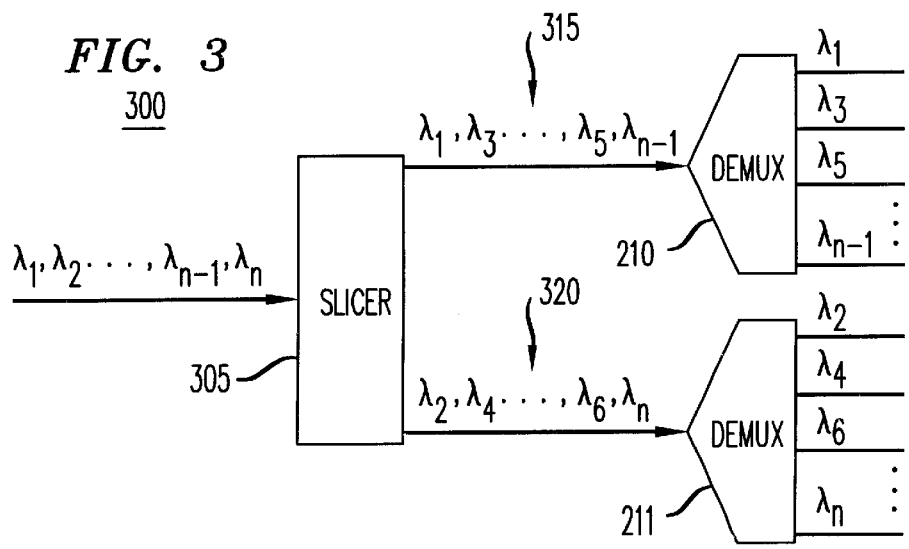

FIG. 3 shows another illustrative embodiment for substantially eliminating cross-traffic according to the principles of the invention. More specifically, optical demultiplexing arrangement 300 includes a wavelength slicer 305 that receives the multi-wavelength WDM signal that includes optical channels shown here as having wavelengths $\lambda_1, \lambda_2, \ldots \lambda_{n-1}, \lambda_n$, where n is an even number. As shown, wavelength slicer 305 separates the WDM signal into two separate output signals 315 and 320. Output signal 315 includes the odd number optical channels (e.g., wavelengths $\lambda_1, \lambda_3$, and so on) and output signal 320 includes the even number optical channels (e.g., wavelengths $\lambda_2$, $\lambda_4$, and so on). One type of device suitable for use as wavelength slicer 305 is the well-known Mach-Zehnder two-path interferometer with arrayed waveguides. Another suitable device is a fused biconically tapered fiber coupler. Other types of commercially available wavelength splitters, couplers and so on that are equivalent in function to those shown and described herein will be apparent to those skilled in the art.

Each of the output signals 315 and 320 is then separately demultiplexed by optical demultiplexers 210 and 211, respectively. By further separating the previously adjacent optical channels, the potential for channel mis-identification at an optical receiver is substantially eliminated. In particular, optical channels that are adjacent in the wavelength spectrum are now demultiplexed in two different optical demultiplexers. For example, optical channel having wavelength $\lambda_3$ is demultiplexed by optical demultiplexer 210 while adjacent (i.e., adjacent in wavelength) optical channels having wavelengths $\lambda_2$ and $\lambda_4$ are demultiplexed by optical demultiplexer 211. Because of this channel separation, crosstalk signal power of the adjacent channels having wavelengths $\lambda_2$ and $\lambda_4$ will not be mis-identified and locked onto by an optical receiver coupled to optical channel having wavelengths $\lambda_3$ during a loss of signal in that channel. Again, this arrangement substantially improves the crosstalk suppression performance as compared to only relying on crosstalk suppression provided by a single optical demultiplexer. Those skilled in the art will appreciate that the wavelength separation and/or splitting function provided by wavelength slicer 305 can be achieved and/or enhanced in a number of ways (e.g., by using multiple stages of interferometers) in order to achieve the desired crosstalk suppression performance necessary for eliminating the potential for cross-traffic conditions.

Figure 4:
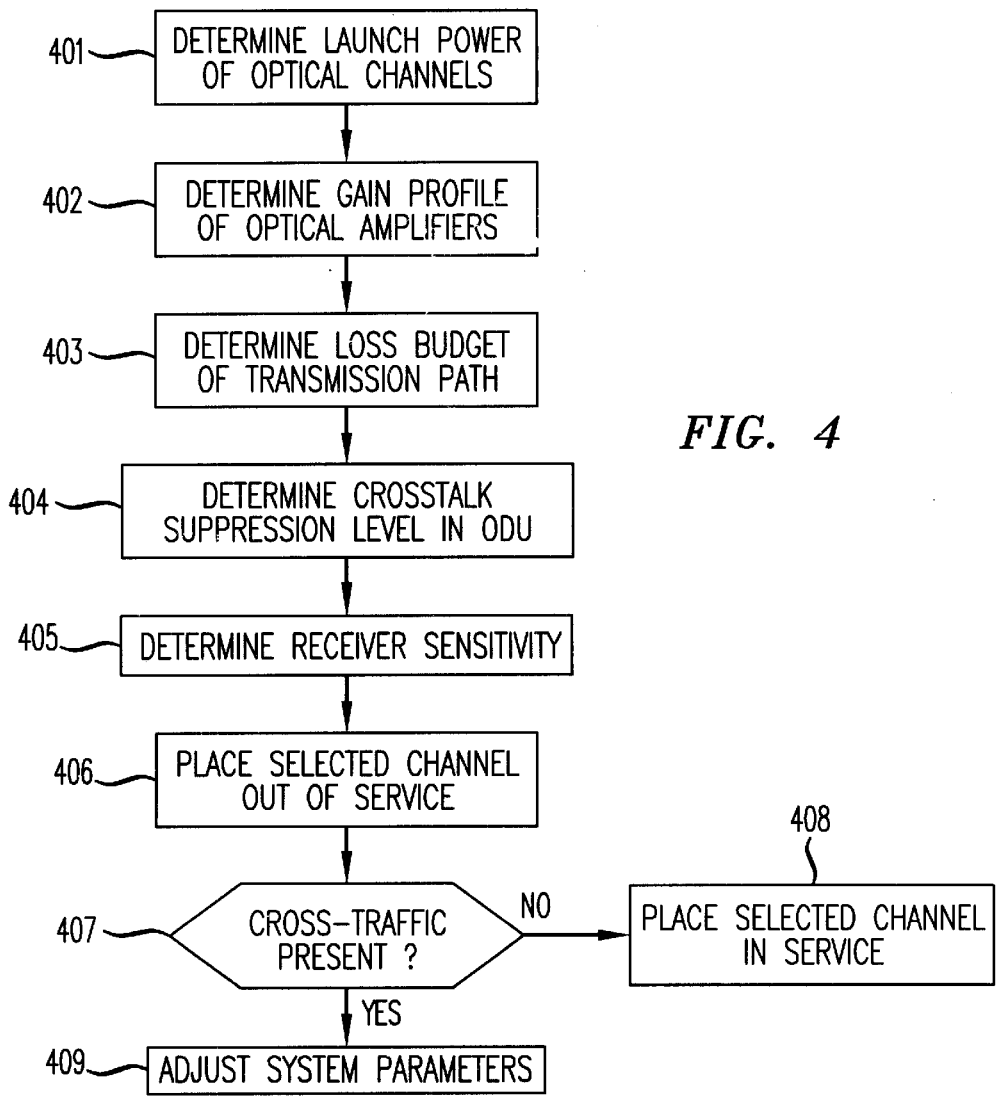
FIG. 4 is a simplified flow diagram of an illustrative embodiment of the invention.

FIG. 4 shows another embodiment of the invention in which crosstalk-induced cross-traffic can be substantially avoided in a WDM system. More specifically, FIG. 4 is a simplified flowchart that illustrates steps for determining an actual or potential cross-traffic condition resulting from crosstalk contribution by other optical channels. In step 401, the launch power of the optical channels of interest are determined. The determination of launch power will depend, in part, on the type of system and components being used in the system. By way of example, launch power in systems using optical translator units (OTUs) would be determined as a function of the output signal power from the OTUs. In step 402, the gain profile of optical amplifiers for the optical channels of interest is determined since the gain profile may affect the per channel power of the optical channels because of factors such as power divergence and so on. The loss budget of the transmission path is determined in step 403. In general, any factors that contribute to the increase and/or attenuation of the optical channels of interest can be relevant. In step 404, the crosstalk suppression provided by the optical demultiplexer (or other device of interest) is determined. As described, crosstalk suppression is a design parameter for these devices and, as such, can be readily derived. Receiver sensitivity is determined in step 405 because the sensitivity threshold is a significant factor in whether an optical receiver will improperly lock onto the signal in an adjacent optical channel.

To determine whether a potential cross-traffic condition exists, a selected channel is placed out of service to cause a loss of signal condition as shown in step 406, e.g., by removing a circuit pack, disconnecting a fiber connector, and so on. The system is then monitored to determine whether the optical receiver for the channel placed out of service improperly identifies and locks onto crosstalk from an adjacent channel. That is, to determine whether cross-traffic is present as shown in step 407. For example, this can be done using a spectrally resolved optical monitoring scheme. If cross-traffic is not detected, then the optical channel is placed back in service as shown in step 408. If cross-traffic is detected, then remedial action can be taken. For example, system parameters could be adjusted, if possible, as shown in step 409.

Figure 5:
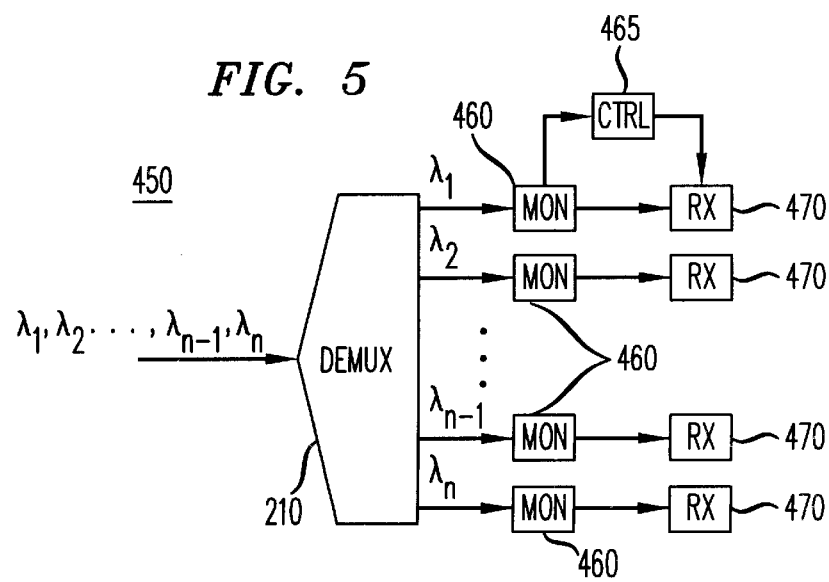
FIG. 5 is a simplified block diagram of another illustrative embodiment of the invention.

FIG. 5 shows another illustrative embodiment of the invention in optical demultiplexing arrangement 450. More specifically, optical demultiplexer 210 again receives the multi-wavelength WDM signal that includes optical channels shown here as having wavelengths $\lambda_1, \lambda_2, \ldots \lambda_{n-1}, \lambda_n$. Optical demultiplexing arrangement 450 further includes monitors 460 coupled between each of the outputs from optical demultiplexer 210 and the respective optical receivers 470. Although only one is shown, a controller element 465 is further coupled between each of the monitors 460 and optical receivers 470.

In general, monitors 460 provide an optical monitoring scheme for channel identification while controller elements 465 are used for providing some control information or commands to optical receivers 470. More specifically, conventional systems typically rely on the optical receiver being able to lock back onto a signal after a loss of signal condition is cleared in the path or equipment. That is, the optical receiver is expected to lock back onto the correct signal once restored. However, as previously described, crosstalk signal power from adjacent channels may cause an optical receiver to lock onto an adjacent channel thereby giving a false indication that service is in fact restored. As such, arrangement 450 in FIG. 5 is intended to provide additional intelligence to optical receivers 470 by performing channel identification in lieu of or in addition to that performed automatically by optical receiver 470.

In one embodiment, optical monitors 460 can be a photodetector or an array of photodetectors used to detect the individual optical channels using techniques well-known to those skilled in the art. Alternatively, a commercially available optical spectrum analyzer can be used in place of monitors 460 to provide a channel identification function. The characteristics and operating principles of optical spectrum analyzers are also well-known to those skilled in the art. Upon receiving channel identification information, a controller element 465 could then be used to inform the respective optical receiver 470 of whether a channel mis-identification has occurred in an optical receiver, e.g., if an optical receiver locked onto an adjacent channel, so that corrective action can be taken. Controller element 465 can be implemented in hardware and/or software in a feedback or feedforward-based scheme.

Although the illustrative embodiments described herein are particularly well-suited for optical demultiplexing applications in a wavelength division multiplexed (WDM) network, numerous modifications and alternative embodiments of the invention will be apparent to those skilled in the art in view of the foregoing description. It should also be noted that cross-traffic can be substantially reduced or prevented using a combination of approaches described and illustrated in the preceding embodiments. Accordingly, the description is to be construed as illustrative only and is for the purpose of teaching those skilled in the art the best mode of carrying out the invention and is not intended to illustrate all possible forms thereof It is also understood that the words used are words of description rather than limitation, and that details of the structure may be varied substantially without departing from the spirit of the invention. The exclusive use of all modifications that come within the scope of the appended claims are hereby reserved.

What is claimed is:

1. A method of controlling crosstalk in a wavelength division multiplexed signal including a plurality of optical channels of different wavelengths, the method comprising:

substantially reducing crosstalk contribution from optical channels that are adjacent in wavelength to a failed optical channel so that an optical receiver corresponding to the failed optical channel is prevented from locking onto a signal in an adjacent optical channel, thereby substantially preventing a cross-traffic condition in the failed optical channel, wherein the cross-traffic condition is characterized by traffic from an adjacent optical channel being transmitted and received in the failed optical channel.

2. The method according to claim 1, wherein the failed optical channel is an optical channel in which a loss of signal has occurred.

3. The method according to claim 1, wherein the crosstalk contribution from optical channels is reduced to a level below a sensitivity threshold of the optical receiver corresponding to the failed optical channel.

4. The method according to claim 1, wherein the crosstalk contribution from optical channels is substantially reduced by post-filtering individual optical channels that are demultiplexed from the wavelength division multiplexed signal.

5. The method according to claim 1, wherein the crosstalk contribution from optical channels is substantially reduced by:

splitting the wavelength division multiplexed signal into at least two output signals, each of the at least two output signals having a plurality of optical channels spaced apart in wavelength so that the optical channels that are adjacent in wavelength in the wavelength division multiplexed signal are in different ones of the at least two output signals; and separately demultiplexing each of the two output signals.

6. The method according to claim 5, wherein the wavelength division multiplexed signal is split according to an alternating wavelength relationship so that the at least two output signals include a first output signal having even numbered optical channels and a second output signal having odd numbered optical channels.

7. A method of controlling crosstalk in a wavelength division multiplexed signal including a plurality of optical channels of different wavelengths, the method comprising:

substantially reducing crosstalk contribution from optical channels that are adjacent in wavelength to a failed optical channel so that an optical receiver corresponding to the failed optical channel is prevented from improperly identifying crosstalk signal power from an adjacent channel as an indication that the failed optical channel has been restored, thereby substantially preventing a cross-traffic condition in the failed optical channel, wherein the cross-traffic condition is characterized by traffic from an adjacent channel being transmitted and received in the failed optical channel.

8. A method of operating a wavelength division multiplexed system that carries a wavelength division multiplexed signal including a plurality of optical channels of different wavelengths, the method comprising:

substantially reducing crosstalk contribution from optical channels that are adjacent in wavelength to an optical channel of interest so that the presence or absence of the optical channel of interest is detectable by an optical receiver corresponding to that optical channel of interest, such that, during a loss of signal condition in the optical channel of interest, an optical receiver corresponding to the optical channel of interest is prevented from locking onto a signal in an adjacent optical channel, thereby substantially preventing a cross-traffic condition in the optical channel of interest, wherein the cross-traffic condition is characterized by traffic from an adjacent optical channel being transmitted and received in the optical channel of interest.

9. A method of receiving a wavelength division multiplexed signal having a plurality of optical channels of different wavelengths, the method comprising:

demultiplexing the wavelength division multiplexed signal into individual optical channels;

monitoring the individual optical channels to facilitate channel identification; and providing channel identification information to optical receivers coupled to respective individual optical channels, wherein an optical receiver corresponding to a failed optical channel is prevented from improperly identifying crosstalk signal power from one or more optical channels adjacent in wavelength to the failed optical channel as an indication that the failed optical channel has been restored, thereby substantially preventing a cross-traffic condition in the failed optical channel, wherein the cross-traffic condition is characterized by traffic from an adjacent channel being transmitted and received in the failed optical channel.

10. An optical receiver arrangement in a wavelength division multiplexed system comprising:

an optical demultiplexer for separating a wavelength division multiplexed signal into individual optical channels of different wavelengths;

an optical monitor coupled to one or more of the individual optical channels for obtaining channel identification information;

an optical receiver coupled to one of the individual optical channels; and a control element coupled between the optical monitor and the optical receiver, the control element being operable to provide the channel identification information to the optical receiver so that, when a loss of signal condition occurs in the optical channel coupled to the optical receiver, the optical receiver is prevented from improperly identifying crosstalk signal power from one or more optical channels adjacent in wavelength to the optical channel coupled to the optical receiver as an indication that the optical channel with a loss of signal has been restored, thereby substantially preventing a cross-traffic condition, wherein the cross-traffic condition is characterized by traffic from an adjacent channel being transmitted and received in the optical channel coupled to the optical receiver.

11. An optical receiver arrangement in a wavelength division multiplexed system comprising:

an optical demultiplexer for separating a wavelength division multiplexed signal into individual optical channels of different wavelengths;

a plurality of optical filters coupled to respective ones of the individual optical channels, the plurality of optical filters being operable to further reduce crosstalk contribution from optical channels that are adjacent in wavelength to a failed optical channel so that an optical receiver corresponding to the failed optical channel is prevented from locking onto a signal in an adjacent optical channel, thereby substantially preventing a cross-traffic condition in the failed optical channel, wherein the cross-traffic condition is characterized by traffic from an adjacent optical channel being transmitted and received in the failed optical channel.

12. An optical receiver arrangement in a wavelength division multiplexed system comprising:

an optical splitter for splitting a wavelength division multiplexed signal having a plurality of optical channels of different wavelengths into at least two output signals, each of the at least two output signals having a plurality of optical channels spaced apart in wavelength so that the optical channels that are adjacent in wavelength in the wavelength division multiplexed signal are in different ones of the at least two output signals, further characterized in that the optical splitter comprises an optical slicer operable to split the wavelength division multiplexed signal according to an alternating relationship so that the at least two output signals include a first output signal having even numbered optical channels and a second output signal having odd numbered optical channels; and at least two optical demultiplexers coupled to the optical splitter, each of the at least two optical demultiplexers being operable to separate one of the at least two output signals into individual optical channels, wherein crosstalk contribution from optical channels that are adjacent in wavelength to a failed optical channel is substantially reduced so that an optical receiver corresponding to the failed optical channel is prevented from locking onto a signal in an adjacent optical channel, thereby substantially preventing a cross-traffic condition in the failed optical channel.

* * * * *